Sept. 8, 1931.　　　　F. RIVERS ET AL　　　　1,822,748
TRACTION ATTACHMENT FOR WHEELS
Filed May 10, 1930　　　2 Sheets-Sheet 2
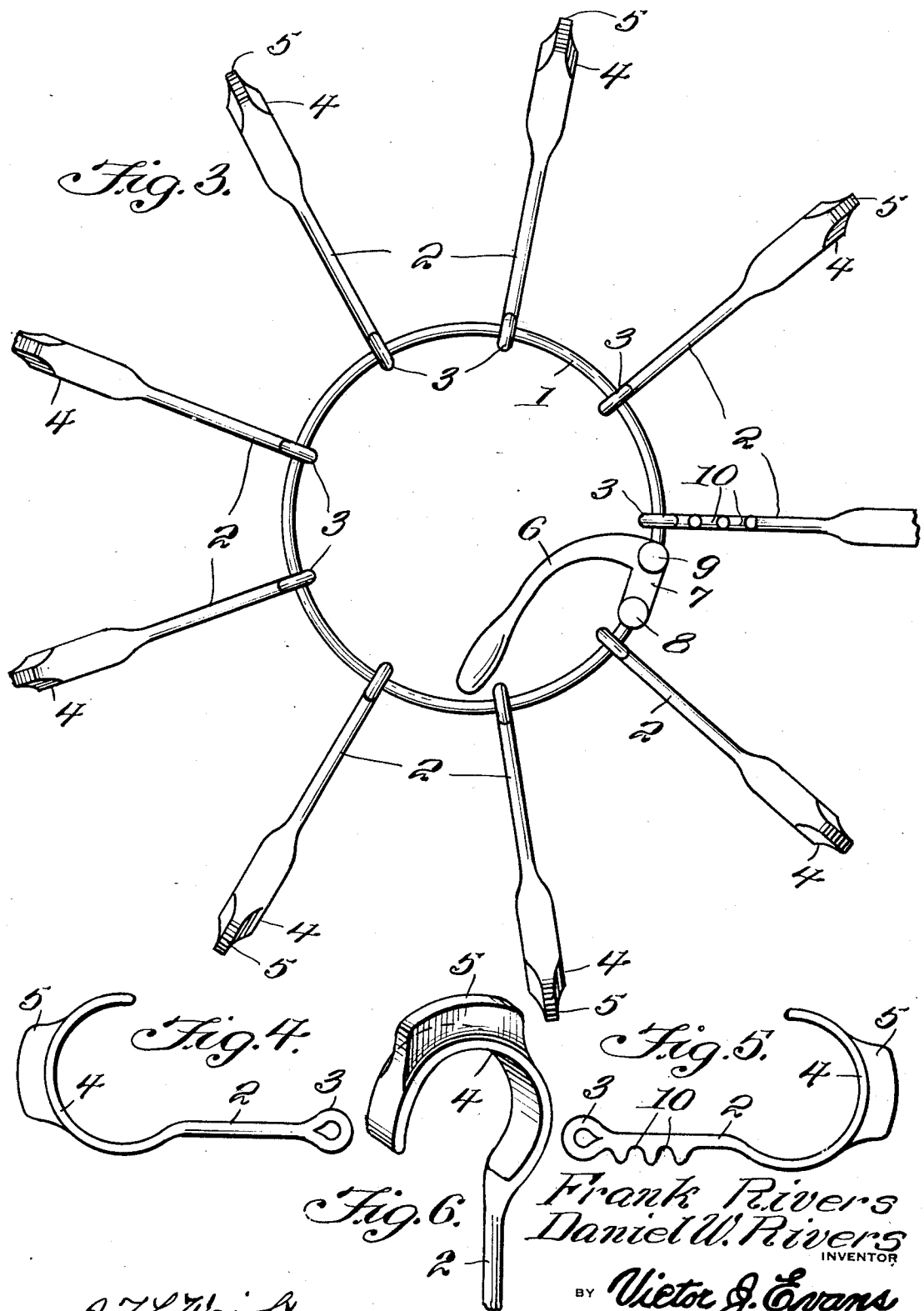

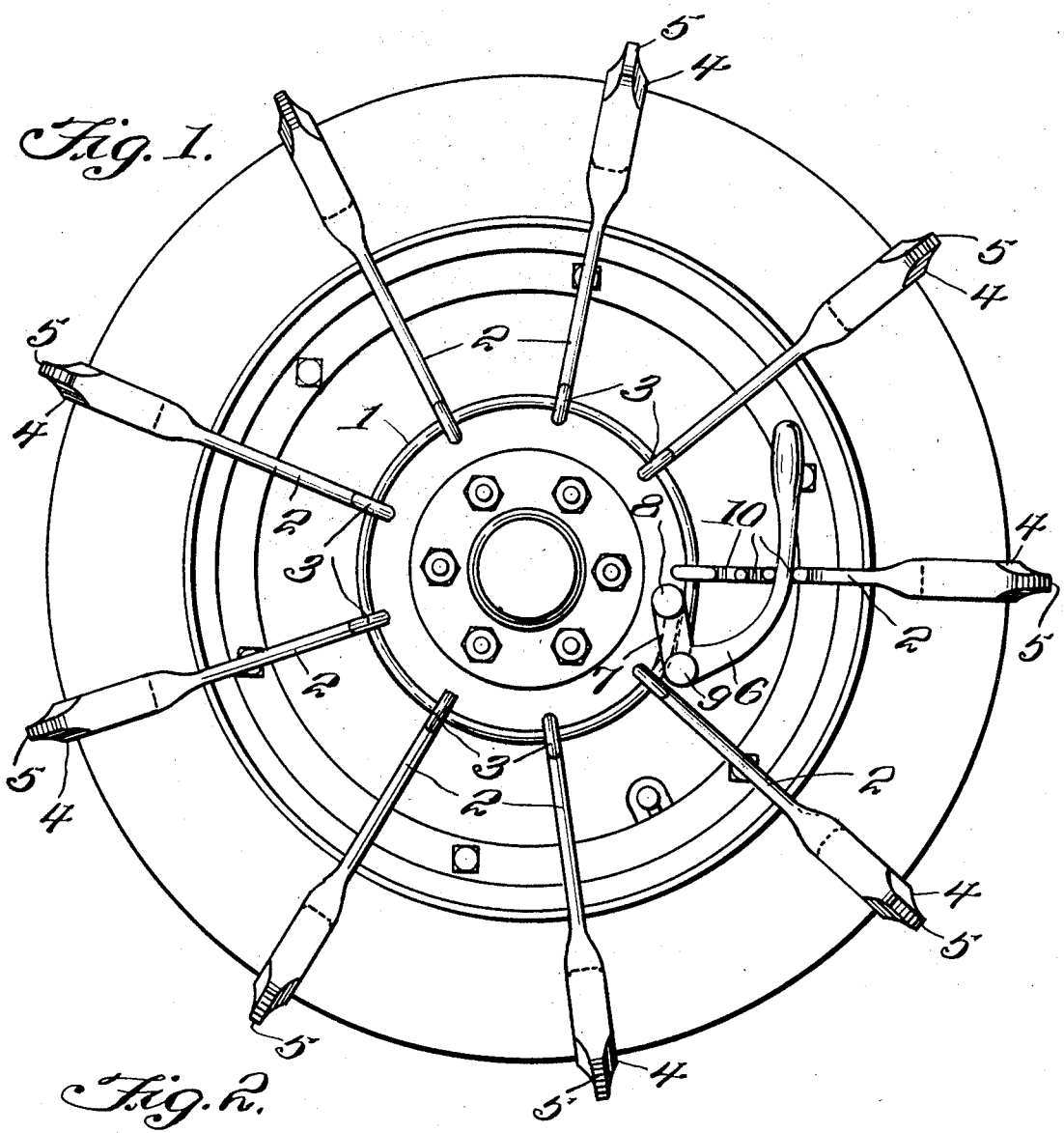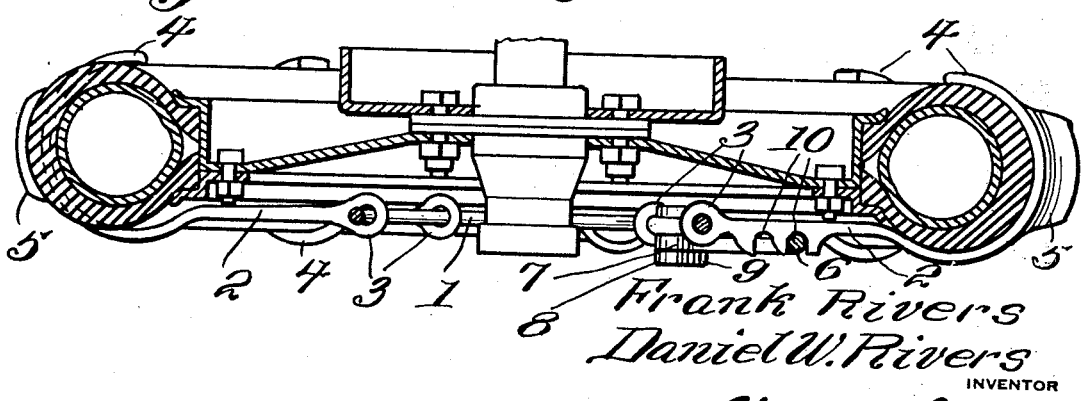

Patented Sept. 8, 1931

1,822,748

UNITED STATES PATENT OFFICE

FRANK RIVERS AND DANIEL W. RIVERS, OF SOLDIER, KENTUCKY

TRACTION ATTACHMENT FOR WHEELS

Application filed May 10, 1930. Serial No. 451,390.

This invention relates to a traction device for a vehicle wheel, the general object of the invention being to provide a split ring of spring metal which is threaded through eyes formed at the inner ends of a plurality of arms having curved outer ends carrying projections, with means for contracting the ring so that the curved ends of the arms will engage parts of the tread of a tire so that the projections will prevent the wheel from slipping or skidding.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of a wheel, showing the invention applied thereto.

Figure 2 is a transverse sectional view through Figure 1.

Figure 3 is a view of the device with the ring in open position.

Figure 4 is an edge view of one of the arms.

Figure 5 is a view of the arm which carries the keeper means.

Figure 6 is a perspective view of the outer end of one of the arms.

In these drawings, the numeral 1 indicates a split ring formed of spring metal and the numeral 2 indicates a plurality of arms which have eyes 3 at their inner ends through which the ring passes. The outer ends of the arms are thickened and these outer portions are of hook shape, as shown at 4, to fit over the tire of a wheel and each hook portion is formed with an outwardly extending flange 5 for forming a mud lug. A lever 6 is formed with a straight part 7 which has its free end pivoted to one end of the ring, as shown at 8, and its other end pivoted to the other end of the ring, as shown at 9, the major portion of the lever being curved.

Thus when the lever is moved inwardly, the ring will be expanded, as shown in Figure 3, and when it is swung outwardly, the ring will be contracted, as shown in Figure 1. When the ring is expanded, the hook portions of the arms can be placed over the tire of a wheel and then by contracting the ring by the lever, the hook portions will be caused to engage the tire, as shown in Figure 1.

One of the arms is formed with the keeper recesses 10 to receive a portion of the lever when the same has been moved to a position to contract the ring and by providing a number of these recesses, the lever can be placed in the proper recess to cause the hook portions of the arms to engage the tire of the wheel in accordance with the size of the wheel on which the device is used. Thus the device can be adjusted to fit different sizes of wheels.

Any number of the arms can be used and as will be seen, the flanges on the hook ends of the arms will serve as mud lugs to prevent the wheel from slipping or skidding.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

A traction attachment for wheels comprising a split resilient ring adapted to encircle the hub of a wheel, a plurality of radially extending arms pivotally and slidably mounted on the ring and having their outer end portions enlarged and bent in hook shape to engage over the tire of the wheel, one of said arms having recesses, and a curved lever having a straight portion disposed angularly thereto and having the ends of said straight portion pivoted to the ends of the ring and adapted when disposed within the ring to expand the latter for applying and removing the hook shaped ends from the tire and when disposed outwardly of the ring within one of the recesses to contract the ring for holding the hook shaped ends of the arms in engagement with the tire.

In testimony whereof we affix our signatures.

FRANK RIVERS.
DANIEL W. RIVERS.